United States Patent [19]
Shular et al.

[11] 3,881,874
[45] May 6, 1975

[54] THERMAL INCINERATION AIR POLLUTION CONTROL DEVICE

[75] Inventors: Howard Edward Shular, North Olmsted; John Sellors, Jr., Shaker Heights, both of Ohio

[73] Assignee: Pyronics, Inc., Cleveland, Ohio

[22] Filed: May 7, 1973

[21] Appl. No.: 358,146

[52] U.S. Cl. ............ 23/277 C; 23/288 F; 423/210; 60/296; 432/214; 432/216; 432/217
[51] Int. Cl. .......................................... B01j 9/02
[58] Field of Search ....... 23/277 C, 288 F; 423/210; 60/296; 432/214, 216, 217

[56] References Cited
UNITED STATES PATENTS

| | | | |
|---|---|---|---|
| 869,582 | 10/1907 | Lowe | 48/74 |
| 2,121,733 | 6/1938 | Cottrell | 423/210 |
| 2,844,452 | 7/1958 | Hasche | 48/196 |
| 2,898,202 | 8/1959 | Houdry et al. | 60/296 X |

FOREIGN PATENTS OR APPLICATIONS

| 542,131 | 1/1931 | Germany | 23/277 C |
|---|---|---|---|

*Primary Examiner*—James H. Tayman, Jr.
*Attorney, Agent, or Firm*—Meyer, Tilberry & Body

[57] ABSTRACT

Control of air pollution from organic solvents is achieved by a device for burning air-entrained hydrocarbons. The device comprises a housing, an elongated passageway, a burner in the center of the passageway dividing the passageway into two alternating combustion chambers, honeycombed fire brick at the remote end of each chamber for absorbing heat from the exiting gases and means for periodically reversing the flow of air-entrained hydrocarbons through the passageway whereby heat absorbed by the firebrick at one end of the passageway preheats the entering gases when the flow is reversed.

3 Claims, 7 Drawing Figures

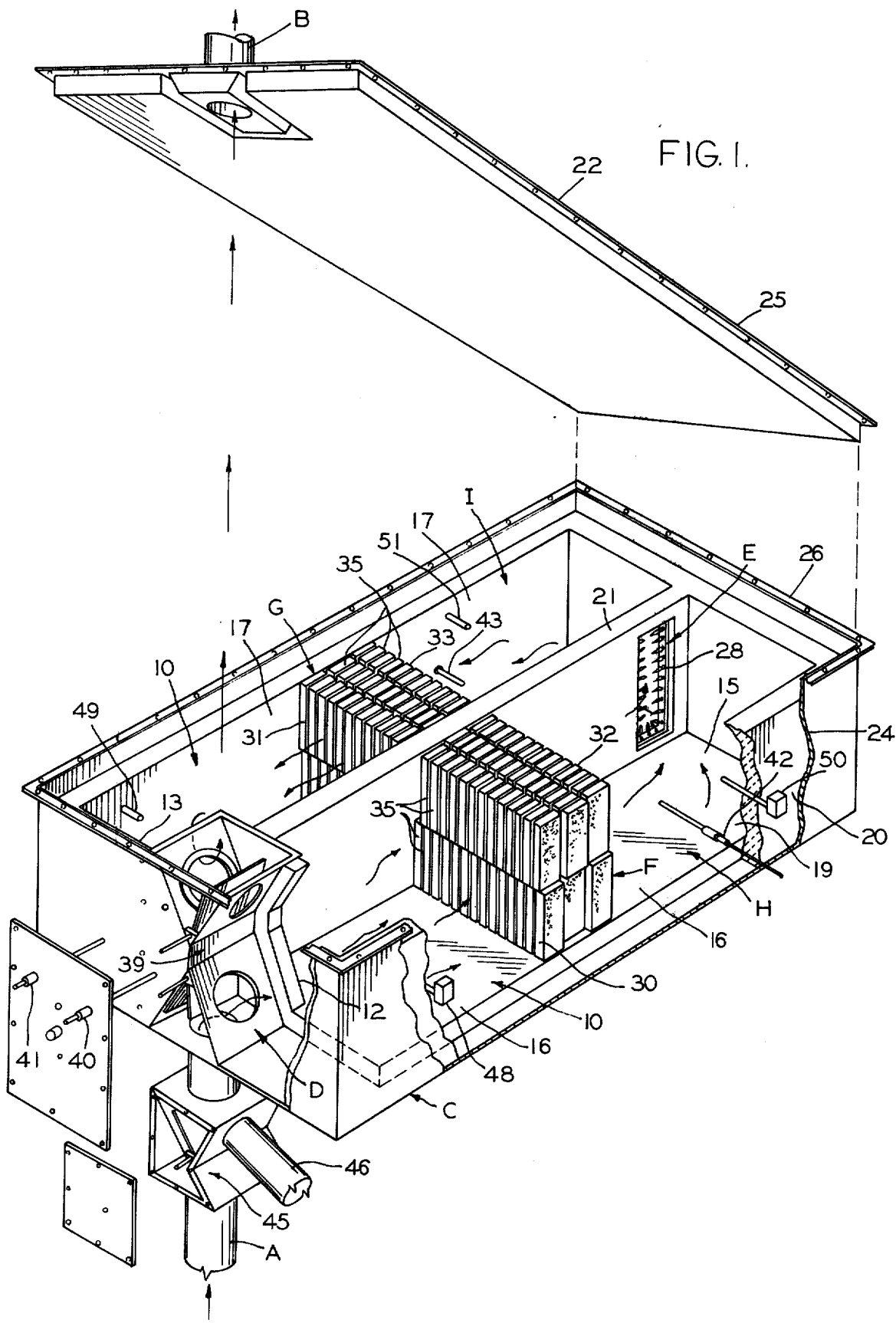

THERMAL INCINERATION AIR POLLUTION CONTROL DEVICE

This application pertains to the art of pollution-control devices commonly known as afterburners, and more particularly to a thermal incineration air pollution control device utilizing heat-recovery means.

The invention is particularly applicable to air pollution control devices for use in conjunction with spray paint booths and will be described with particular reference thereto although it will be appreciated that the invention in its broader application can be applied to any commercial process giving off organic solvents such as core baking ovens in foundries, wire coating ovens, solvent degreasers, paint baking ovens, etc.

Spray paint booths ordinarily have large exhaust fans to remove hydrocarbon solvents as they evaporate from the sprayed paint. Heretofore the mixture of air and hydrocarbons, referred to herein as dirty gas, was simply exhausted to the atmosphere. More recently afterburners have been required in paint booth installations to meet pollution code requirements.

These afterburners must be capable of heating the dirty gas to the auto-ignition temperature of the hydrocarbons and maintaining this temperature for a sufficient dwell or residence time to insure that all of the hydrocarbons will burn to water vapor and carbon dioxide which are commonly considered as clean gases and are not detrimental to the environment. Pollution codes establish auto-ignition temperatures and dwell times at levels sufficient to insure thorough hydrocarbon combustion and clean gas. Typical codes for afterburners applied to paint spray booths require that the gases be heated to approximately 1400° F for a residence time of at least 0.2 to 0.5 sec. These operating limits require afterburners having high capacity gas burners which use relatively large amounts of gas.

Heretofore, many afterburner installations have simply exhausted the heated clean gases out a stack to the atmosphere without any attempt to recover the heat expended. Such installations must use burners requiring a constant gas flow input to provide the necessary rise to 1400° F.

Some afterburner installations have placed heat exchangers in the stack after the gas has passed through the burner to recover some heat from the clean gases which is then used to preheat the dirty gas before passing through the burner. However, these installations are generally inefficient, recovering at best up to only 50% of the heat discharged.

A somewhat more efficient heat-recovery system circulates the dirty gases through ductwork in the stack beyond the burner, thereby preheating the dirty gas prior to passing it through the burner. However, these heat exchangers tend to plug from the impingement of carbonaceous materials against hot surfaces making them difficult to clean and expensive to operate.

The present invention contemplates a thermal incinerator air pollution control device which operates at high thermal efficiency by means of a regenerative heat recovery process.

In accordance with the present invention an air pollution control device is provided comprised of an elongated passageway communicating at both it ends to ductwork through which the gases pass. A heat source midway of the length of the passageway divides it into two combustion chambers, each of suitable length to provide thorough combustion considering the gas velocities and dwell time. At the ends of each combustion chamber, heat absorbing material, preferably high-temperature ceramics such as firebrick, is arranged in such a manner that a large surface area of the brick is exposed to the passing gases. Means are provided for periodically reversing the direction of flow of gases through the passageway. The reversing may be caused by timers, temperature probes or other condition sensing means.

In operation, dirty gas from the spray booth is directed in one direction through the passageway where it is pre-heated by the firebrick previously heated from a prior heat cycle. After leaving the firebrick, the preheated dirty gas traverses the remaining distance of the first combustion chamber and passes through the heat source where it is raised to the autoignition temperature of the hydrocarbons. It remains at this temperature for a sufficient dwell time to become a clean gas as it traverses the second chamber. The heated clean gas then heats the firebrick at the end of the second chamber as the gas passes therethrough before exiting to the stack. When the firebrick reaches a predetermined temperature, the gas flow is reversed whereby the relatively hot firebrick is now used to preheat the incoming dirty gas and the relatively cold firebrick in the other chamber now absorbs heat from the exiting clean gas.

The efficiency of the afterburner in terms of heat recovered is a function of the temperature of the entering dirty gas to the temperature of the exiting clean gas with improved efficiency resulting as the heat cycles increase in frequency.

Thus, the capacity of the burner used in the device can be less than that of existing burners because the burners need only raise the dirty gas temperature from the preheated to the auto-ignition temperature. Furthermore because the fuel fed to the burner is modulated, little or no fuel is required at the beginning of each heat cycle with the burner input increasing as the firebrick cools. Tests show that burner input runs from nearly 0 to 60% of the maximum that would be required by a nonheat recovery system. This amounts to a 50 to 70% decrease in the amount of fuel used from non-heat recovery systems on a longterm average basis.

The preferred embodiment utilizes a generally U-shaped passageway with the burner mounted at its apex and the ends of the passageway communicating with the exhaust duct work for the gases. Valve members in the duct work affect the reversal of flow. This arrangement permits the afterburner to be constructed with a minimum amount of ductwork and also provides a compact design for installations where space limitations must be considered.

In accordance with another aspect of the invention pressure probes are located at each end of the firebrick. In the event that carbon soot accumulates in the firebrick (limiting the gaseous flow) the pressure controls will override the normal controls for reversing the flow, thereby continuing the flow in one direction so that the firebrick will be heated to a temperature sufficient to oxidize the carbon soot whereupon the afterburner will revert to its normal cycling sequence.

In accordance with still another aspect of the invention, means are provided to introduce for a short time, either fresh air and/or clean gas into the entrant passageway of the afterburner immediately prior to reversing the gas flow. The entrant passageway is thus purged of dirty gases before the reversal of direction of flow takes place. Thus the possibility of a slug of dirty gas being emitted at each reversal of flow is eliminated.

It is the principal object of the invention to provide a thermal incineration air pollution control device which has high thermal efficiency.

It is a further object to provide a pollution control device having a pair of heat absorbing means on each side of the heat source and valves for periodically reversing the flow of gases through the burner whereby entering dirty gases may be preheated by one of the means heated by exiting gases on a previous cycle.

Another object of the invention is the provision of a new and improved pollution control device having incorporated therein a pair of spaced heat absorbent means and a burner therebetween in combination with means for periodically reversing the flow of gas through the burner so that heat absorbed by one means on one cycle can be used to preheat incoming gases on the next cycle.

It is a more specific object of the invention to provide a thermal incineration air pollution control device capable of dissipating carbon soot collected in the heat absorbing means.

It is a further object of the invention to provide an air pollution control device which periodically reverses the flow of hydrocarbon bearing air and includes means immediately prior to each reversal to introduce purge gas into the afterburner.

A still further object of the invention is to provide an air pollution control device.

It is a further object of this invention to provide a compact, easily-constructed pollution control device which is efficient and economical in operation.

The invention may take physical form in certain parts and arrangements of parts, a preferred embodiment of which will be described in detail herein and illustrated in the accompanying drawings which form a part hereof and wherein;

FIG. 1 is a perspective view of the assembled pollution control device.

Figure 3:
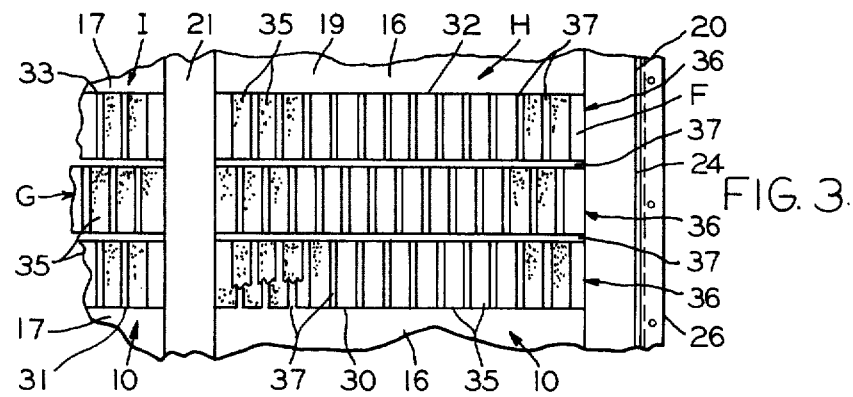
FIG. 3 is a top view of the heat absorbent means taken along line 3—3 of FIG. 2.
Figure 2:
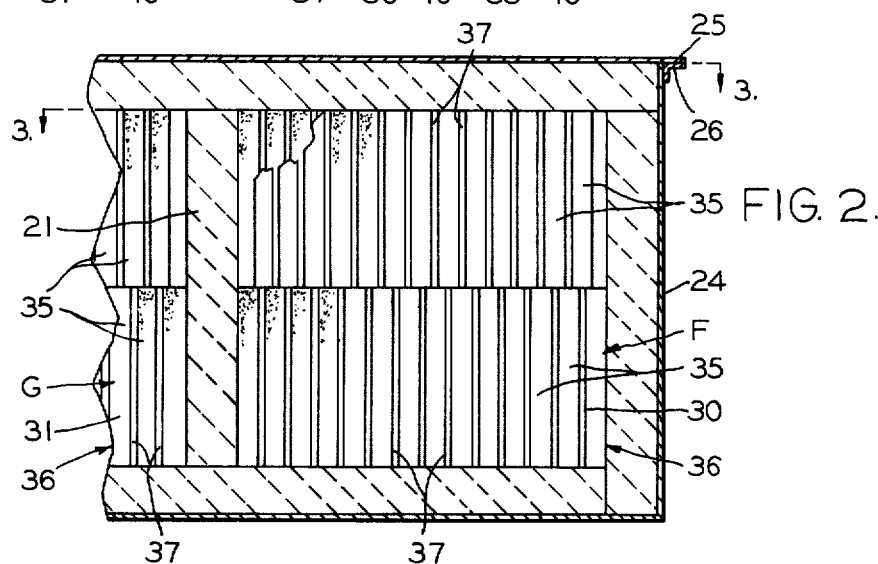
FIG. 2 is a frontal elevation of the heat absorbent means.

Referring now to the drawings wherein the showings are for the purpose of illustrating a preferred embodiment of the invention only and not for the purpose of limiting same, FIG. 1 illustrates an air pollution control device installation comprising an intake duct A leading from a source of dirty gas, an exhaust duct B for discharging clean gas, an air pollution device C positioned intermediate ducts A and B for heating the dirty gas, and valve means D for periodically reversing the flow of gas through the afterburner C. The air pollution device C comprises an elongated U-shaped passageway having a heat source E at the base thereof, heat absorbing means F, G at the ends of the passageway, and combustion chambers H, I between the heat source E and the heat absorbing means F, G respectively.

Not shown because unnecessary to the description of the invention is the exhaust fan in the spray booth and its connection to duct A. Likewise, the smoke stack and its connection to duct B are not shown.

THE AIR POLLUTION CONTROL DEVICE

The air pollution control device C is positioned intermediate ducts A and B and its structure defines an elongated passageway 10 therein. The ends 12, 13 of passageway 10 are adapted to be in communication with ducts A and B.

Passageway 10 can assume a wide variety of configurations such as straight, S-shaped, spiralled, etc. Similarly the profile of passageway 10 could be circular, eliptical, rectangular or even possess necked-down sections in combination therewith. In the preferred embodiment passageway 10 is U-shaped thereby permitting air pollution control device C to be connected to ducts A and B with a minimum length of duct work. The profile is shown as rectangular for ease of construction. As thus defined, elongated passageway 10 comprises a base portion 15 and two legs 16, 17 of equal length extending therefrom and terminating in ends 12, 13 respectively; ends 12, 13 adapted to be in communication with ducts A and B.

The air pollution control device structure defining the U-shaped configuration of passageway 10 comprises a bottom rectangular surface 19; a side wall surface 20 extending from the edges of bottom surface 19 and defining the rectangular shape of control device C; a longitudinally extending center wall 21 bisecting the width of control device C and defining the legs 16, 17 of passageway 10; and a top surface 22 similar in configuration to the bottom surface 19. Each aforementioned component is constructed of an insulating material such as firebrick and abuts against a material 24 such as heavy gauge sheet metal which imparts sufficient structural rigidity to control device C. Top surface 22, which is removable to permit access to passageway 10 for cleaning, repairs, etc., is secured to the afterburner by a top flange 25 extending around its periphery and abutting against a similarly shaped flange 26 extending around the periphery of the side wall surface 20; fasteners securing flanges 25, 26 together. Hence, the structure of control device C encloses passageway 10 in an effective heat insulating manner.

The heat source E is located in an opening in the center wall 21 near its end adjacent base portion 15 of passageway 10. The heat source E may utilize any type of heating medium such as electricity although in the preferred embodiment a natural gas-fired burner 28 is shown. The burner 28 can assume a wise variety of shapes such as ring or oval shaped but a narrow rectangular configuration is shown in the preferred embodiment. It should be noted that by positioning burner 28 in the center wall 21, the base portion 15 of passageway 10 is bisected. It should also be noted that the only opening connecting legs 16, 17 of passageway 10 to one another is through the burner opening, thus assuring a tight burner profile.

Heat absorbing means F, G are located near the ends 12, 13 of passageway 10 remote from the burner 28, generally filling the width of legs 16, 17 respectively. It is possible for the heat absorbing means to have a wide variety of structural configurations and to be constructed of such diverse material as firebrick, ceramics or sheet metal. Heat absorbing means F, G are characterized generally as having forward ends 30, 31 and rearward ends 32, 33 respectively.

In the preferred embodiment the heat absorbing means F, G comprise a plurality of firebricks 35 spaced apart from one another in a plurality of rows 36, each row 36 being offset from adjacent rows 36 in both a horizontal and vertical plane. The spacing between each brick 35 defines openings or passages 37 and because the firebrick rows 36 are offset from one another, the passages 37 are staggered. The area of the passages 37 is relatively small when compared to the surface area of the firebricks 35 thus permitting the heat absorbing means F, G to possess a high heat transfer ratio.

Combustion chambers H, I are defined as the portions of passageway legs 16, 17 which extend from the heat absorbent rearward ends 32, 33 to the burner 28 respectively. The lengths of combustion chamber H, I are equal. Furthermore, because combustion chambers H, I are adapted to burn the dirty gas into clean gas while such gas traverses its length, the length of combustion chambers H, I is determined as a function of the dwell time and velocity of the gas within the combustion chambers H, I.

VALVE MEANS

The valve means D for periodically reversing the direction of flow of gas through control device C comprises a valve generally indicated at 39 in combination with sensing means indicated generally at 40. The sensing means is adapted to actuate the valve means by conventionally known drive mechanisms, not shown because unnecessary to the description of the invention.

The structure of the valve 39 shown in FIG. 1 does not comprise part of this invention and while flapper valves are illustrated it should be clear that butterfly valves or any other valving arrangement could be substituted therefor. The valve 39 must however interconnect the intake duct A, the exhaust duct B and the ends 12, 13 of passageway 10. Furthermore, the valve must have at least two positions. In one position the intake duct is in communication with one of the ends 12, 13 of passageway 10 while the exhaust duct B is in communication with the other end 12, 13 of passageway 10. In the other valving position the aforementioned connections are reversed.

In the preferred embodiment the sensing mechanism comprises temperature sensing probes 40, 41 and 42, 43. Probes 40, 41 are located adjacent the foreward ends 30, 31 of heat absorbing means F, G respectively and are adapted to sense the temperature of the existing clean gas. Probes 42, 43 are located adjacent the rearward ends 32, 33 of heat absorbing means F, G respectively and are adapted to sense the temperature of the gas within combustion chambers H, I.

In conjunction with valve 39 there is provided a second valve 45 and a purge gas duct 46 connected thereto. As with valve 39, the structure of the second valve 45 is similarly not a part of this invention. It is necessary only that valve 45 interconnect the intake duct A with the purge gas duct 46 and valve 39. Valve 45 must also provide two positions. In the first position intake duct A is in communication with valve 39 and the purge gas duct 46 is closed. In the second position intake duct A is closed and purge gas duct 46 is in communication with valve 39. Not shown because conventional is a drive mechanism for actuating valve 45 and the circuit which controls the drive mechanism.

OPERATION

As thus described the operation of control device C as applied to a paint spray booth is as follows:

1. The dirty gas accumulating in the spray booth is exhausted from the spray booth by means of a fan into the intake duct A.
2. The dirty gas leaves intake duct A by means of a second valve 45 and enters one of the passage legs 16 hereafter referred to as the preheat leg.
3. In the course of traversing the preheat leg 16, the dirty gas passes through the heat absorbing means F in the preheat leg 16 in heat transfer relationship therewith whereby the temperature of the dirty gas is raised from ambient i.e., 70°F to a preheated range usually between 400° and 700°F. (The heat absorbing means F in the preheat leg 16 has been previously heated from the previous after burner cycle.)
4. The preheated dirty gas then traverses the combustion chamber H in the preheat leg 16 and passes through the burner flame thereby the gas is raised to its auto-ignition temperature of approximately 1400°F.
5. The heated gas then traverses the other leg 17 of passageway 10, hereafter referred to as the final heat leg, and passes through that portion of the final heat leg 17 defined as combustion chamber I. The gas remains at its heated temperature for a sufficient dwell time, approximately 0.2 to 0.5 sec., during which time it becomes clean gas.
6. The clean heated gas then passes in heat transfer relationship through heat absorbing means G in the final heat leg 17 which, from the previous heat cycle is in a relatively cool state. The clean gas enters the rearward end 33 of heat absorbing means G at a temperature of 1400°F and leaves the forward end 33 of heat absorbing means G at a temperature between 200° and 700°F.
7. The clean gas then finishes traversing the length of final heat leg 17 existing at its ends 13 to the exhaust duct discharged into the smoke stack and out into the atmosphere.
8. As the afterburner operates, it is apparent the heat absorbing means in the preheat leg 16 will begin to cool as it transfers its heat to the dirty gas flowing therethrough. Thus, the temperature of the dirty gas leaving heat absorbing means F at the beginning of the heat cycle will be at one temperature level, and this temperature will decrease until it reaches a lowermost level at the end of the heat cycle when the flow of gas through the afterburner will be reversed. During this time, temperature sensing probe 42 or 43 modulates valve 60 to maintain combustion chamber I at the auto-ignition temperature of the dirty gas.

It should also be similarly apparent that the heat absorbing means G in the final heat leg 17 will increase in temperature during the heat cycle as it absorbs the heat from the clean gas passing therethrough. Thus at the beginning of the heat cycle the temperature of the clean gas leaving heat absorbing means G will be relatively cool and the temperature of the exiting gas will increase until it reaches a predetermined upper limit. At this time, temperature probe 40 or 41 will close to operate valve 39.

The drive mechanism will first actuate the second valve 45 by closing the intake duct A and opening purge gas duct 46 for a fraction of a second. During this time the purge gas will travel by means of valve 39 through the preheat leg 16 until reaching the heat absorbing means F. When this occurs valve 45 will return to its initial position and valve 39 will be actuated to its second position whereby the flow of gases through the control device C will be reversed and the above-described heat cycle is now completed. The preheat leg 16 of passageway 10 now becomes the final heat leg. Similarly the final heat leg 17 of passageway 10 now becomes the preheat leg. The temperature of combustion chamber H is controlled by probe 42 and probe 40 now serves the exiting gas temperature thereby controlling the heat cycle.

It is thus apparent that the cycling time is dependent upon the temperature limits set and the mass of the heat storage medium. For example, assuming that the outlet temperature of the clean gas regulates the cycling, a 20-minute heat cycle would occur if the upper temperature limit for the exiting clean gas was established at 800°F. If the outlet temperature limit were reduced to 400°F the cycling time would be decreased to approximately 4 to 10 minutes. Thus the efficiency of the thermal incinerator air pollution control device is a function of the cycling period.

Having thus described the structure and operation of control device C changes may be made thereto without departing from the spirit or essence of the invention. For example, as noted in the description of valve means D, the sensing means could employ various devices in combination with one another which measure various physical properties of the gases. Thus, as shown in FIG. 1, there are two pair of pressure sensing devices 48, 50 and 49, 51 adjacent the ends of heat absorbing means F, G respectively. The pressure controls override the temperature control means by suitable mechanisms not shown if the passages 37 in the heat absorging means F, G become clogged. This may happen when a sufficient amount of cold dirty gas has impinged on the firebrick 35 in the preheat heat absorbing means F, G. This impingement tends to cause condensation of some of the hydrocarbons, in time, slowly plugging the preheat absorbing means. If so a pressure differential will result in the dirty gas flow through the heat absorbing means and when the differential reaches a predetermined level, for example 0.05 inch of water, the pressure controls will override the temperature sensing probes and prevent the afterburner from cycling. Because the flow of gas through the afterburner is restricted, the heat from the burner will move a high temperature zone through the firebrick in the preheat absorbing means burning out the carbonaceous material that plugged the brick and thus restore unimpeded flow of the clean gas through the heat absorbing means. The control device C will then recycle at the limits previously established.

Figure 4:
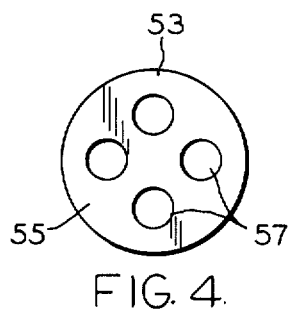
FIGS. 4, 5 and 6 illustrate a modification to the heat absorbent means.
Figure 5:
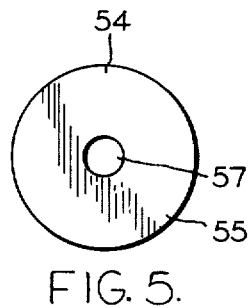
Figure 6:
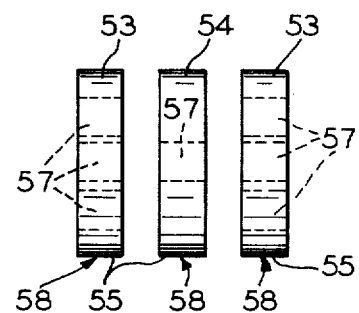

A modification to the heat absorbing means F, G is shown in FIGS. 4, 5 and 6. As shown the heat absorbing means comprises a series of plates 53, 54 having circular peripheries 55, it being contemplated that they will be assembled in legs 16, 17 having similar profiles. Plates 53, 54 could be constructed of ceramics, firebrick or sheet metal. Plates 53, 54 have passages 57 through the plates in a predetermined pattern. For ease in explanation, the hole pattern shown comprises one hole 57 in plates 53 and 4 holes 57 in plates 54. The plates are assembled in the afterburner at spaced intervals 58 corresponding to the passages 37 of the firebricks in the preferred embodiment. As thus assembled the holes 57 will not be in alignment with one another and the hydrocarbon flow through the plates 53, 54 will be discontinuous thereby resulting in a high heat transfer ratio between the plates and the gas.

High heat transfer values could also be obtained by using the same hole pattern for all the plates and simply orientating the plates when assembled in the afterburner to provide staggered passages 37. A still further modification would be to eliminate the discontinuous flow concept and employ therefor a ceramic tube bundle which would comprise heat absorbing means F, G. Heat would be transferred to the ceramic bundle as the gas flows through the relatively small openings in each tube.

Another modification to control device C employs a permanent purge gas inlet communicating with inlet duct A or the passageway 10. The purge gas inlet supplies clean gas or air to the unburned hydrocarbons in the dirty gas thereby providing sufficient oxygen to assure thorough combustion. In the preferred embodiment the afterburner was applied to paint spray booths which are required by insurance codes to mix an excess amount of air with the paint solvents to insure that the lower explosion limit is never reached. For example, a typical code requires 10,000 cubic feet of air for every gallon of solvent spray. This ratio assures that the solvent fumes or dirty gas is never richer than one-quarter the lower explosive limit and thus provides sufficient air not only to assure thorough combustion of the dirty gas, but also for the combustion of the booster gas through the burner and also for oxidizing the carbonaceous plugging matter in the refractory brick.

Obviously, many different types of control circuits may be used for operating the pollution control device. The circuit forms no part of the present invention, and one circuit will be briefly described with reference to the diagrammatic illustration in FIG. 7. A main on-off switch 72 is provided for energizing the control circuit. Limit switches 74 and 76 are connected in series with main switch 72 and in parallel with one another. Temperature sensing devices 40 and 41 are respectively connected in series with the limit switches 74 and 76. Temperature sensing devices 40 and 41 are connected through a switch 80 with solenoid 82 for operating purge valve 45. A holding relay 84 is provided for holding switch 80 in position for connecting temperature sensing devices 40 and 41 in series with a reversing switch 86 for motor 88 operating valve 39. Temperature sensing devices 42 and 43 are respectively connected in series with limit switches 74 and 76. Temperature sensing devices 42 and 43 are connected in series with temperature control valve 90 which controls the rate of fuel supply to burner E. A constant auto-ignition temperature is maintained in combustion chambers H and I by modulating valve 90 in accordance with the temperature sensed by either of the temperature sensing devices 42 and 43. Pressure switches 48, 49, 50 and 51 are connected in parallel with one another, and in series with main switch 72 and the lower part of the control circuit for bypassing limit switches 74 and 76, and temperature sensing devices 40 and 41.

Assume that valve 39 is in a position so that gas flows through heat absorbing means F, into chamber H, into chamber I, through heat absorbing means G and out exhaust duct B. With valve 39 in this position, limit switch 76 is closed while limit switch 74 is open. This connects temperature sensing devices 41 and 43 in circuit, while temperature sensing devices 40 and 42 remain out of connection. As air flows through the device, temperature sensing device 43 monitors the temperature in combustion chamber I for regulating valve 90 to maintain and auto-ignition temperature. When temperature sensing device 41 senses a high temperature in the gas being exhausted, temperature sensing device 41 closes. Closing of temperature sensing device 41 energizes relay 82 through switch 80 for shifting purge valve 45 into the previously described position for allowing influx of fresh purge air through duct 46. Purge valve 45 may be spring biased to a position normally closing purge duct 46 and move to the position opening purge duct 46 by solenoid 82. Upon reaching the full open position for opening purge duct 46, valve 45 operates switch 80 for moving it in connection in series with holding relay 84. This movement of switch 80 de-energizes solenoid 82 so that purge valve 45 moves back to its position blocking purge duct 46. Thus, a temporary influx of fresh purge air has been provided. When switch 80 is moved into connection in series with holding relay 84, holding relay 84 is energized for holding switch 80 in series therewith. This starts operation of motor 88 for shifting valve 39 to its opposite position and reversing the direction of air flow through the pollution control device. Upon reaching its opposite position, valve 39 opens limit switch 76 so that holding relay 84 is de-energized and switch 80 moves back in series connection with solenoid 82. This also stops motor 88. However, the impetus left in movement of motor 88 and valve 39 operate limit switch 74 for moving it to its closed position. This then connects temperature sensing devices 40 and 42 in the control circuit. With air flow reversed, temperature sensing device 42 monitors the temperature in heating chamber H for regulating valve 90. When the temperature of the gases reach a predetermined point, temperature sensing device 40 closes to again operate solenoid 82 through switch 80. Solenoid 82 momentarily moves purge valve 45 to the position opening purge duct 46. Upon reaching its full open position, purge valve 45 moves switch 80 into its position in series with holding relay 84. This deenergizes solenoid 82. Holding relay 84 then holds switch 80 in the other position. Reversing switch 86 has also been reversed by movement of valve 39 to its other position. Therefore, motor 88 will drive valve 39 back in its opposite direction to again reverse the direction of air flow through the pollution control device. Upon again reaching its opposite position, valve 39 opens limit switch 74 and closes limit switch 76. Opening of limit switch 74 de-energizes holding relay 84 so that switch 80 moves back to connection in series with solenoid 82. The device is then ready for another operating cycle. Pressure switches 48, 49, 50 and 51 are connected as shown so that any one of the pressure switches sensing an over pressure condition will bypass limit switches 74 and 76, and temperature sensing devices 40 and 41, to operate solenoid 82 and motor 88 for shifting the valve for reversing the direction of air flow through the pollution control device.

Figure 7:
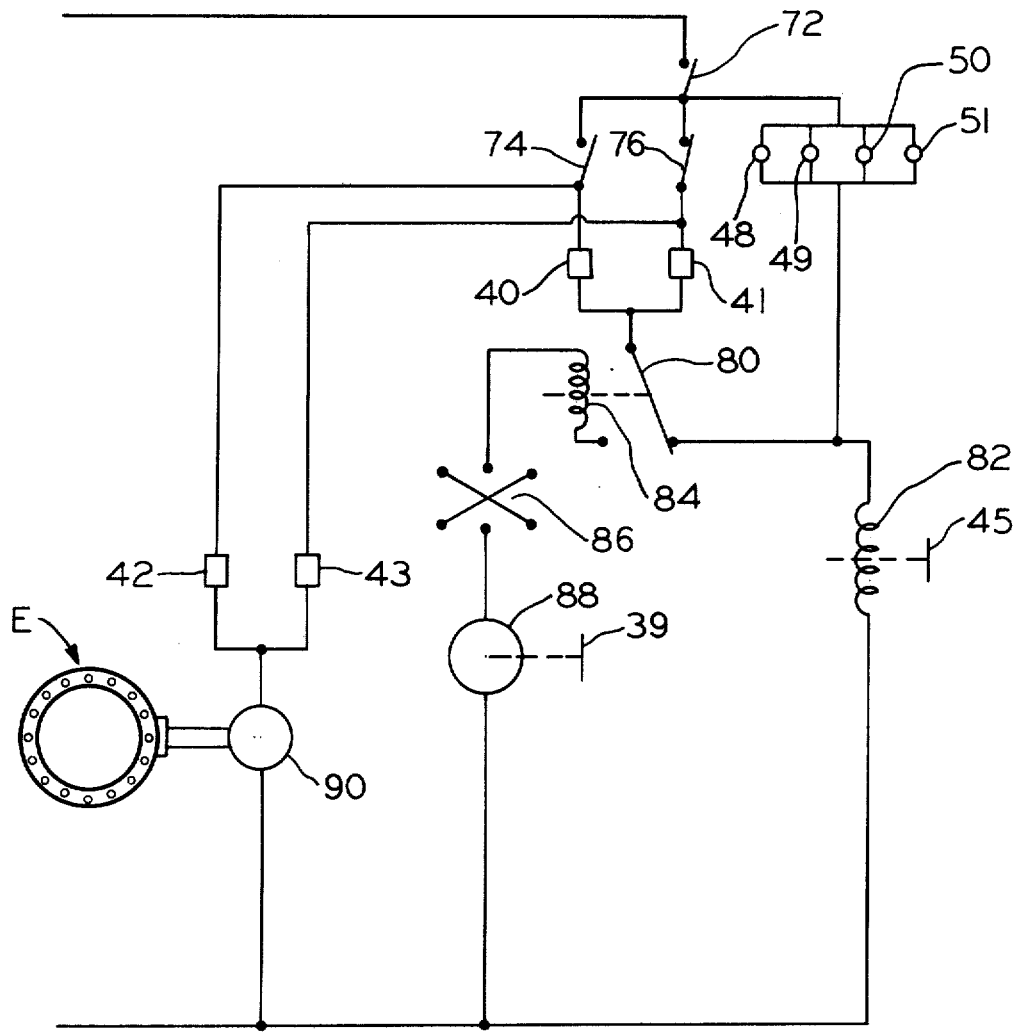
FIG. 7 illustrates a control circuit.

It is obvious that many other control arrangements may be provided for the device. The example in FIG. 7 is merely a diagrammatic showing of one typical control arrangement. For certain applications, it is also possible to use a timer for controlling movement of valve 39 so that it is moved between its opposite positions for reversing the direction of air flow at predetermined time intervals.

Having thus described our invention, we claim:

1. A thermal incineration air pollution control device for heating a mixture of air and gaseous hydrocarbons to the auto-ignition temperatures of the hydrocarbons comprising:
   a. a housing
   b. a member having an opening at one end dividing the length of said housing into an elongated U-shaped passageway having a base and leg portions extending therefrom, said passageway adapted to be communicated at both ends with an inlet and a discharge duct through which said gases flow;
   c. first valve means in said housing directing said gases from said inlet duct alternately into either end of said passageway and alternately from the opposite end of said passageway into said discharge duct;
   d. a heat source in said opening midway of the length of said passageway and dividing said passageway into first and second chambers;
   e. heat absorbing means at the ends of each chamber and substantially spaced from said heat source to provide a combustion chamber on each side of said heat source between said heat source and the adjacent ends of said heat-absorbing means;
   f. means for periodically actuating said valve means and reversing the direction of flow of gases from said ducts to said passageway whereby gases moving toward said heat source are preheated from heat from said heat-absorbing means and gases flowing from said heat source heat the other heat-absorbing means to an elevated temperature;
   g. said actuating means comprising at least one temperature sensing probe in each said passageway and drive means to actuate said valve means when said temperature probe reaches a predetermined temperature whereby the direction of flow of gases through said passageway is reversed and
   h. pressure sensing means in working relationship with said temperature probes, said pressure sensing means including means overriding said temperature sensing means when the flow of hydrocarbons through said heat-absorbing means reaches a predetermined pressure drop thereby temporarily preventing reversal of flow through said passageway.

2. The device as set forth in claim 1 wherein said pressure means comprise a pair of pressure sensing probes for each heat absorbing means adapted to sense the pressure differential between gases on each side of said heat absorbing means, and means actuating said drive means only when the pressure differential between each pair of pressure probes is below a predetermined value.

3. The device as set forth in claim 2 wherein each heat absorbing means has a forward and rearward end and each pressure probe and a temperature probe is located adjacent an end of said heat absorbing means.

* * * * *